Sept. 5, 1944.   W. L. COOLEY   2,357,459
ATTITUDE CONTROL APPARATUS
Filed March 6, 1940   4 Sheets-Sheet 1

INVENTOR.
WILLIAM L. COOLEY
BY George B. White
ATTORNEY.

Sept. 5, 1944. W. L. COOLEY 2,357,459
ATTITUDE CONTROL APPARATUS
Filed March 6, 1940 4 Sheets-Sheet 3

INVENTOR.
WILLIAM L. COOLEY
BY George B. White
ATTORNEY.

Sept. 5, 1944.　　　　W. L. COOLEY　　　　2,357,459
ATTITUDE CONTROL APPARATUS
Filed March 6, 1940　　　　4 Sheets-Sheet 4

INVENTOR.
WILLIAM L. COOLEY
BY George B. White
ATTORNEY.

Patented Sept. 5, 1944

2,357,459

UNITED STATES PATENT OFFICE 2,357,459

ATTITUDE CONTROL APPARATUS

William L. Cooley, San Carlos, Calif., assignor, by direct and mesne assignments, to Archie A. Baldocchi, San Francisco, Calif.

Application March 6, 1940, Serial No. 322,554

11 Claims. (Cl. 244—77)

This invention relates to attitude control method and apparatus.

An object of this invention is to provide an attitude control for mobile objects, for instance for aircrafts or other vehicles, whereby any slight deviation from a predetermined attitude is quickly corrected without over control in either direction.

Another object of this invention is to provide a method and apparatus for correcting deviation of a mobile object from a predetermined attitude or direction by quick intermittent action within an initial range of deviation and by more pronounced force in a range in excess of said initial deviation.

Another object of this invention is to provide an attitude or direction control by means of quick intermittent, repeated corrective forces within a predetermined range of initial deviation from a predetermined attitude or course, and a substantially continual force for correcting wider deviations in excess of said predetermined initial range.

Another object of this invention is to provide intermittent attitude correcting pulses to the control mechanism of a mobile object by interaction between electro-magnetic control actuation and photo electric action so that the actuation of said electro-magnetic control momentarily reduces the effectiveness of the photo-electric action until the photo-electric action exceeds the reduction caused by the actuation of the electro-magnetic control.

Another object of this invention is to provide an apparatus for controlling the attitude and direction of a mobile object, and particularly to provide an attitude responsive control, for instance a compass actuated direction control, which has therein various novel features for efficiency of operation; the apparatus among many other advantageous features including the novel arrangement for the photo-electric action of the control, a simple and efficient multiple photo-electric cell, a flexible control shutter for the photo-electric action, an easily set course adjustment mechanism coacting with the photo-electric cells; an interacting electric circuit including the control actuators, and photo-electric action mechaninsm so as to render them alternately operative within a predetermined zone of turn or deviation; an arrangement of light sources for the photo-electric action so as to protect the apparatus from any interference from the mass or heat of the lighting mechanism, and other novel features which will be evident from the description of this invention.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of my invention.

With the foregoing and other objects in view, which will be made manifest in the following detailed description, reference is had to the accompanying drawings for the illustrative embodiment of the invention, wherein.

In my method the controlling of the attitude of an object is accomplished partly by intermittent correcting action. Preferably the correction is divided in two zones of operation. An initial deviation up to a predetermined degree is corrected by intermittent impulses, or quick momentary corrective forces exerted on the attitude control mechanism of the object. Deviations in excess of said predetermined initial stage or zone are corrected by a more constant and lasting corrective force. This action prevents overcontrol because the application of corrective forces is working just sufficiently long to achieve the return of the object to a predetermined attitude and no further.

The division into said zones of action is accomplished by electric actuation of the control mechanism and the rendering of said actuation momentarily ineffective by and upon each actuation of the control mechanism whenever the corrective force is applied within a predetermined initial zone of deviation.

In connection with circuits controlled by photo-electric action this division is accomplished by so interrelating the control actuating circuit and the photo-electric action that the photo-electric action is rendered momentarily ineffective for the operation of said actuating circuit upon each actuation of the attitude control within a given zone of deviation. It is preferable that a circuit breaker in said circuit be closed by photo-electric action. The photo-electric action in this method is attitude responsive. In addition the photo-electric action is automatically and momentarily rendered by each actuation of said attitude control ineffective for closing said circuit breaker and thereby alternately actuates said attitude control and opens the actuating circuit for momentarily ceasing such actuation.

The attitude control is suitable to the attitude desirable to be maintained for the balance or movement of the object controlled. For instance in case of vehicles the attitude usually controlled is the direction of movement of the vehicle. In connection with aircrafts automatic control of direction of movement is of particular importance. Overcontrol is detrimental in connection with all objects, but it is particularly objectionable in connection with the direction of aircrafts where it usually causes a winding unsecure flight. The herein illustrative embodiment shows the method in connection with so called automatic pilots for the direction control of aircrafts. In this illustration the particular steps involved are the moving of the surface control members, such as the rudders of an airplane, by an electrically actuated mechanism, actuating said mechanism by direction responsive photo-electric action, and actuating this photo-electric action by the deviation of the aircraft from a predetermined direction and also rendering the photo-electric action intermittent by and upon the operation of the electrically actuated rudder adjusting mechanism. This coaction for intermittent action is effective only within a zone of comparatively minor deviations from the course and results in small or short and quick corrective impulses repeated at quick intervals until the deviation is righted. Then during deviation in excess of said predetermined initial deviation this coaction between the devices for such quick intermittent action is rendered ineffective until the deviation is corrected to again fall within said initial zone. The final step of correction is again intermittent similarly to the first. Thus the deviation control nearer to the predetermined course is short and intermittent at all times gradually righting the plane unto its desired course without over control.

The above control herein illustrated is achieved by the control of the light intensity upon photo-electric cells creating said photo-electric action. The control actuating circuit is interrupted by the action of a normally open, sensitive circuit-breaker which is kept energized by photo-electric action caused by light falling upon photo-electric cells. There are two such circuits and two such cells herein to actuate in opposite directions according to the incidence and intensity of light, which latter is controlled by the deviation of the aircraft from a predetermined direction, so as to actuate one circuit breaker or another according to the direction of deviation. In addition the intensity of light is so interrelated with the control actuating circuit that the photo-electric action is varied, by each actuation of the control. oppositely to the variation caused by the initial deviation so as to momentarily negative the action caused by the initial deviation immediately upon each operation of the control. But the negative variation is limited to an amount such as needed for said initial deviation and does not negative variation of intensity of light and photo-electric action caused by deviations in excess to said predetermined deviation.

In the present illustration the photo-electric action is made direction-responsive by a compass control of the incidence and intensity of light upon photo-electric elements. The adjustment for a predetermined direction is accomplished by the step of adjusting the position of the photo-electric elements relatively to the compass controlled light supply so as to render both actuating circuits ineffective when the aircraft flies in the adjusted direction relatively to the compass. The control members are automatically returned to neutral position after the correcting forces thereon are relieved.

Particularly in connection with compass controlled direction correction my method also includes the admission of light through heat insulating layers from the outside of the heat sensitive parts of the instruments, and indirectly reflecting the light through heat insulating layers to the photo-electric elements. In this method also the light is so controlled that there is, whenever the control is applied, sufficient light to keep certain sensitive circuit-breakers continuously partially energized so as to rapidly close the respective circuits upon the slightest suitable variation of light caused by slight deviations from the adjusted direction. The interaction for intermittent control is specifically accomplished in this illustrative embodiment by interconnecting an electric light with the electro-magnetic actuating circuit so that the energizing of the circuit for operating the control or rudder draws the current of the electric light circuit so as to decrease the intensity of the electric light source in about the same degree that the intensity of the light falling upon the respective photo-electric cells was increased by the initial deviation. When the deviation is wide enough to increase the light on either cell in a degree in excess of the variation caused by said energization of the operating electro-magnets then the photo-electric action remains sufficient to keep the operating circuit closed until the deviation is corrected back to said initial degree.

Figure 4:
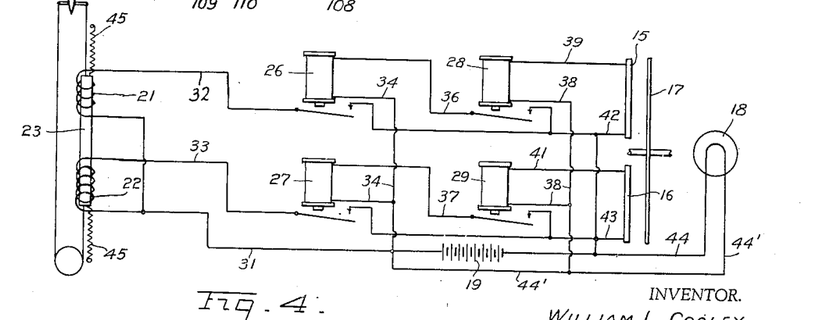
Fig. 4 is a diagrammatic showing of the electric circuit of the control apparatus.

In its general organization the apparatus for the herein described attitude control, as shown particularly in Fig. 4, includes photo-electric cells 15 and 16, an attitude responsive shutter 17 and an electric light source 18 arranged in coactive relation. The photo-electric cells 15 and 16 are connected to a source of electricity of preferably constant current, such as the battery 19. To the same battery 19 are connected electromagnets 21 and 22 which control the control actuating mechanism 23 for operating the attitude control member, in this illustration, the rudder 24 of a vehicle, such as an aircraft. The circuits of the electromagnets 21 and 22 are controlled respectively by power relays or circuit breakers 26 and 27, which latter in turn are controlled and actuated by sensitive relays or circuit breakers 28 and 29, which latter in turn are kept partially energized by the photo-electric action of the respective photo-electric cells 15 and 16. It is to be noted in the wiring diagram in Fig. 4 that line 31 leads from a terminal of the battery 19 to the actuating electro-magnets 21 and 22, but the return lines 32 and 33 respectively are broken at the secondary circuit breakers or power relays 26 and 27 respectively. The line 34 leads from the battery 19 to the power relays or circuit breakers 26 and 27, but the return lines 36 and 37 from said power relays 26 and 27 are broken respectively at the sensitive relays or primary circuit breakers 28 and 29. Lines 38 lead from the battery 19 to the sensitive relays 28 and 29, but the return lines 39 and 41 are subject to the photo-electric action created by the respective photo cells 15 and 16, which latter are in turn connected through lines 42 and 43 to the other terminal of the battery 19. The filaments or incandescent elements of the electric light 18 are connected into the same battery circuit by lines 44 and 44'.

It is to be noted that means are provided to automatically return the attitude control member or rudder 24 to its straight position. In this diagrammatic view in Fig. 4 and for purpose of illustration only, oppositely acting springs 45 are shown to pull the actuating mechanism into substantially balanced neutral position. A structure for operating the controls adapted for use also in the herein combination as shown in my copending application for stability control and apparatus, Serial Number 322,553, filed March 6, 1940.

One of the important characteristics of the herein invention is that up to a predetermined degree of initial deviation the correction is intermittent without any possibility of overcontrol. In the herein illustration this is accomplished by having a shutter 17 transmit always sufficient light to keep both photo-electric cells 15 and 16 partially active, and by so adjusting the primary or sensitive relays 28 and 29 that they are even in neutral, inactive position partially energized by said photo-electric action, but not sufficiently energized to close the circuit of the respective power relays 26 or 27.

The shutter 17 is adapted to gradually increase the light on one photo-electric cell or on the other according to the directions of deviation to which the shutter 17 is relatively responsive. As soon as a sensitive relay 28 or 29 is sufficiently energized to close its circuit the respective power relay 26 or 27 closes the circuit of the electromagnet 21 or 22 respectively for actuating the control mechanism 23 in one direction or in the other. But as seen as either electro-magnet 21 or 22 is energized the current in the entire circuit is decreased and the light 18 is decreased in proportion. By proper adjustment of the sensitive relays 28 and 29 and of the coaction of the shutter 17 and the cells 15 and 16 the circuit is so adjusted that the increase of photo-electric action to close the sensitive relays 28 or 29 up to an initial deviation limit is proportionate to the light decrease caused by the operation of one of the power relays 26 or 27 and of one of the magnets 21 or 22. Hence if the shutter 17 does not increase the amount of light further than said initial deviation limit then the photo-electric action will not be sufficient to hold the sensitive relays 28 or 29 closed and thus the circuit will break after each momentary actuation of the controls. This is repeated while the deviation remains within said predetermined zone of so called initial turn or deviation. The shutter 17 upon deviation in excess of said initial turn increases the amount of light reaching one or the other photo-electric cell 15 or 16 and causes continual photo-electric action thereafter.

The herein particular arrangement of the cells 15 and 16 and of the shutter 17 illustrates a device adapted for such intermittent initial operation within an initial zone of turning.

Figures 5, 6, 7:
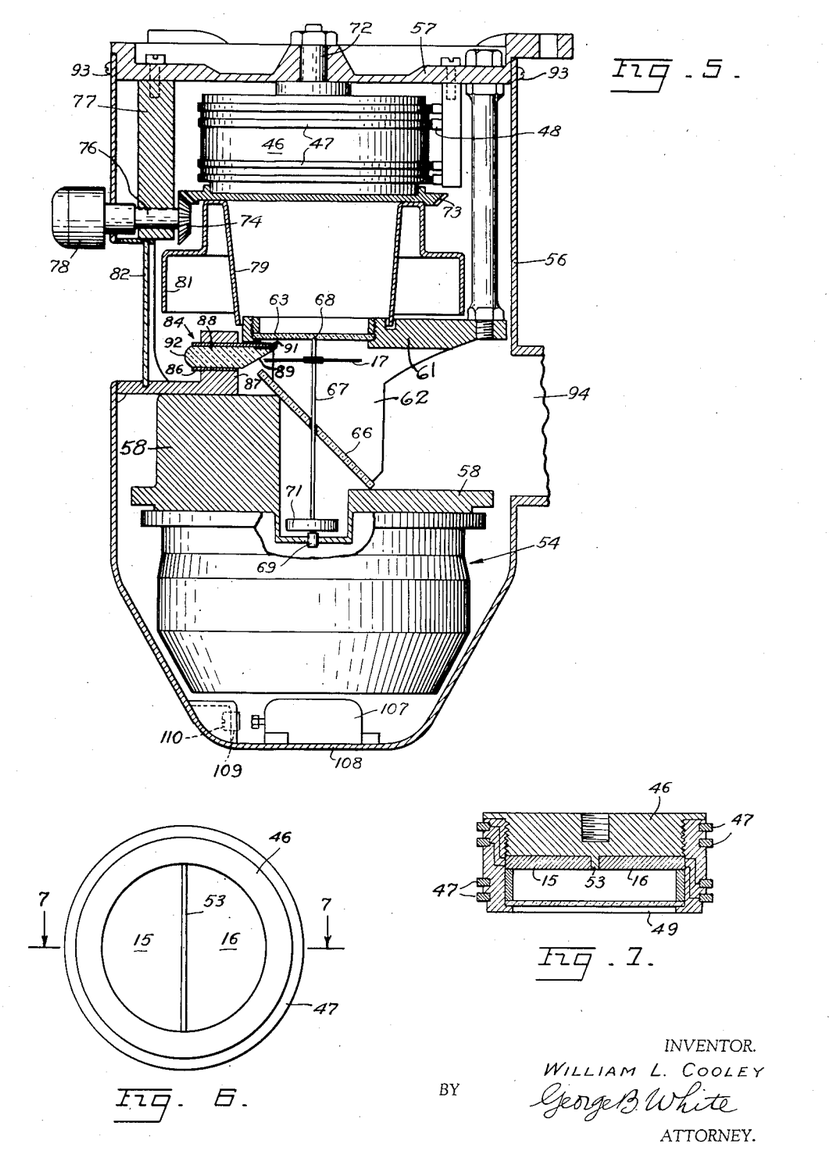
Fig. 5 is a sectional view of the apparatus.
Fig. 6 is a face view of the photo cell and mounting in my apparatus.
Fig. 7 is a sectional view of the photo cell and mounting, the section being taken on the lines 7—7 of Fig. 6.

The photo-electric cells 15 and 16 shown in Figures 6 and 7 are in an insulating casing 46. A usual circular or full cell made of selenium or the like material capable of photo-electric action, is split in two half sections forming adjacent individual cells 15 and 16. Each section or cell 15 and 16 is connected to a conductor ring 47. The conductor rings 47 connect to suitable conductor brushes 48. The cells 15 and 16 are suitably held side by side facing an opening 49 through which light is admitted to said cells. The brushes 48 are connected to the lines 39, 41, 42 and 43 respectively of the control circuits heretofore described. The herein illustration shows a two cell unit for control in two opposite directions, but if multiple attitude control is desired from the same unit, the cell may be split in more segments each connected to a different part of a control circuit, or to a different control circuit.

Figures 8, 9, 10, 11:
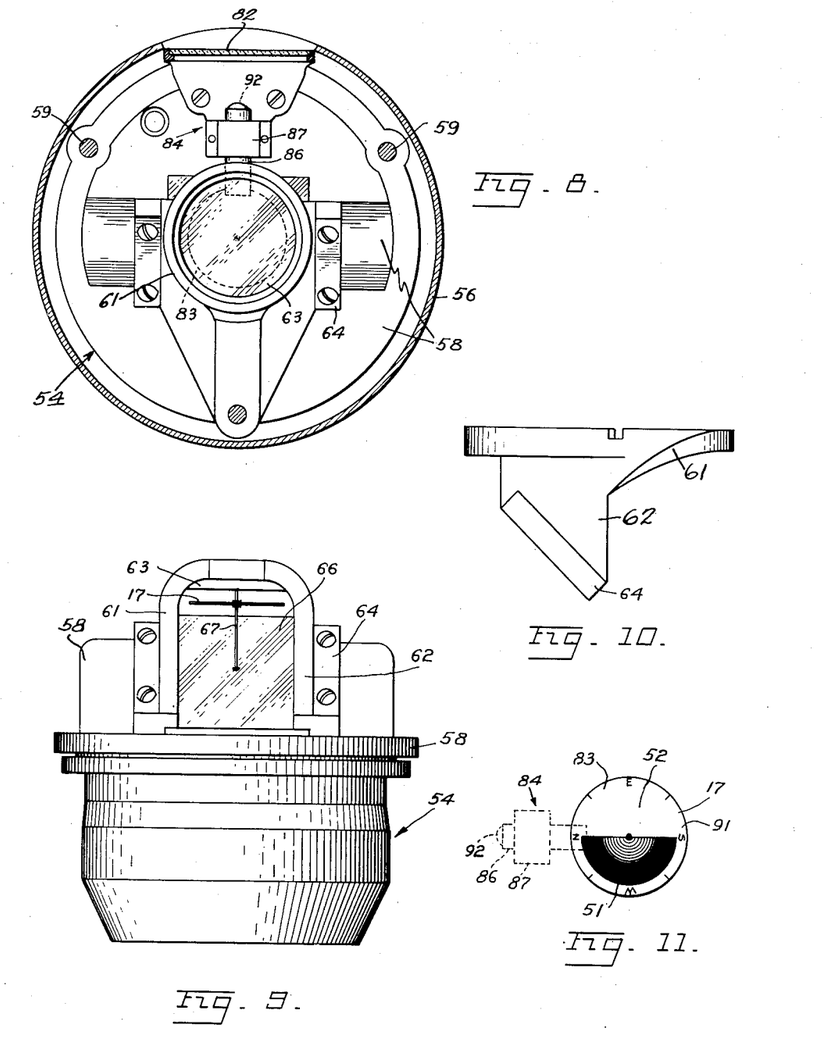
Fig. 8 is a partly sectional plane view of the lower portion of my apparatus with the photo cell and its shields removed.
Fig. 9 is a detail view of the reflector and shutter mounting on the compass casing in my apparatus.
Fig. 10 is a detail view of the bracket for holding the reflector and the shutter bearing.
Fig. 11 is a detail plan view of my shutter and its marginal card reflector.

The shutter 17 in the herein illustration consists of a transparent or translucent disc arranged parallel and in registry with the opening 49 of the cell casing 46. The disc of the shutter 17 is divided, preferably diametrically, into a graduated opaque segment 51 and a transparent segment 52. The opaque graduations are formed by concentric spaced opaque zones gradually becoming denser toward the outer periphery. The normal neutral position of the shutter 17 relatively to the cells 15 and 16 is preferably such that substantially equal amount of light reaches to both photo-electric cells 15 and 16 in said neutral position. In case of division into half segments the diameter of shutter division is at right angles to the diametrical partition 53 dividing the photo-electric cells 15 and 16. In this relative position both photo-electric cells 15 and 16 receive light equally through the transparent half of the disc shutter 17. When the position of the shutter 17 is angularly changed relatively to the photo-electric cells 15 and 16 by the action of a suitable attitude responsive mechanism in one direction or in the other then it admits increased amount of light to the respective photoelectric cell 15 or 16 for increasing its photoelectric action sufficiently to close the corresponding sensitive relay.

In the herein illustration the elements of the attitude control mechanism are shown as applicable to a direction or rudder control and the shutter 17 is controlled by a direction responsive device such as a suitable compass 54. It is to be understood that other attitudes responsive mechanisms may be used for controlling the shutter movement depending on the type of control desired. Even in case of direction control various types of compass, or radio finder or the like may be used for controlling the relative position of the shutter 17 so as to determine the direction of the control.

The cell casing 46, the shutter 17 and the compass 54 are assembled in an instrument casing 56 and supported on a base 57. The compass 54 in this illustration is a suitable magnetic compass and its case has a superstructure 58 which is connected to the base 57 by long studs 59, so as to leave a space between the top of the compass 54 and the instrument base 57 for the cell control. On the top of the compass 54 is a bracket 61 suitably secured to the superstructure 58 of the compass 54. This bracket 61, as shown in Figures 8, 9, and 10, has a top with a circular opening or window covered by a heat insulating transparent or glass pane 63. From this top of the bracket 61 extend spaced side members 62 secured to the compass superstructure 58 which have inclined guides and retainers 64 for holding a mirror 66 facing at about 45° to one side between the side members 62. A light spinning shaft 67 extends through the center of the mirror 66 terminating at its upper end in a pin bearing 68 in the center of the top glass pane 63. The lower end of the shaft 67 is held in a vertical bearing 68 and has thereon a secondary magnet 71 which latter turns with the magnet of the compass 54 so as to hold the shaft 67. The shutter 17 is held on the shaft 67 below said glass pane 68 and faces the cell opening 49 of the cell casing 46. Thus the compass 54 controls the position of the shutter 17 relatively to the photo electric cells 15 and 16 which usually turn with the aircraft relatively to the compass.

The cell casing 46 is mounted on the instrument base 57 by means of a central flanged bolt 72 so that the photo-electric cells 15 and 16 and the entire cell casing 46 can be turned around the vertical axis of the unit. For the purpose of such angular adjustment a gear ring 73 is fixed on the open end of the cell casing 46 in mesh with a bevel gear 74 on an adjusting shaft 76 held in a vertical bearing bracket 77 depending from the instrument base 57. A knob 78 is detachably secured over the outer end of the adjusting shaft 76. By turning the adjusting knob 78 the cells are turned into any selected position relatively to the compass 54 and the shutter 17.

Figure 1:
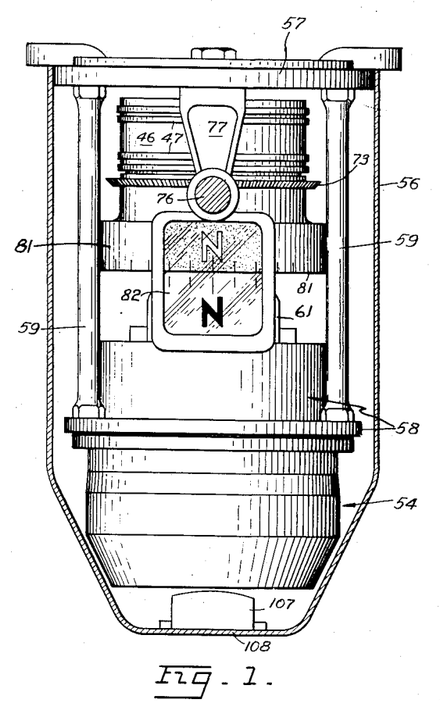
Fig. 1 is a front view of my apparatus the housing being partly broken away.
Figure 2:
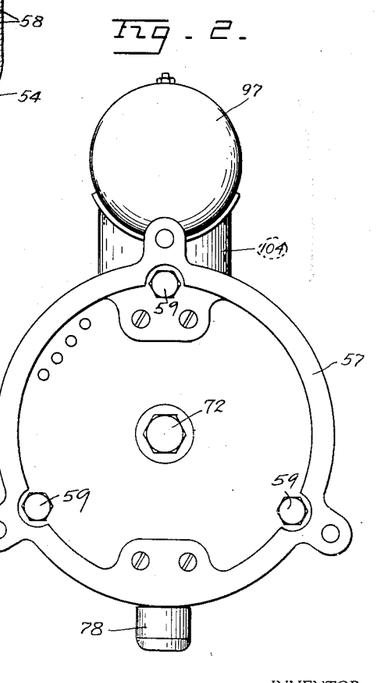
Fig. 2 is a top plan view of my apparatus.
Figure 3:
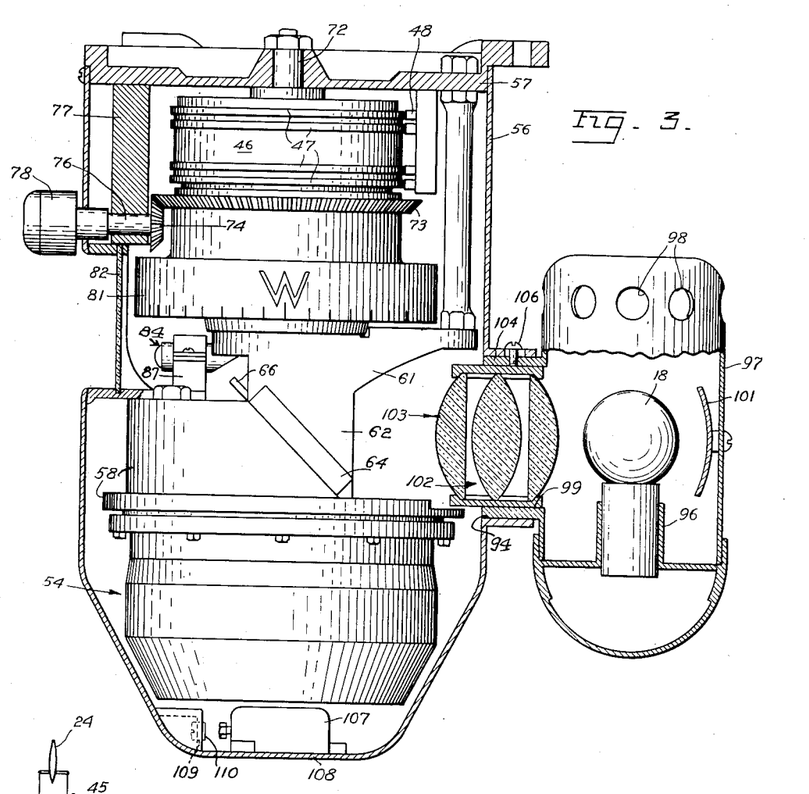
Fig. 3 is a side view of my apparatus partly in section.

The gear ring 73 has a frusto-conical shield 79 extended to the top of the narrow bracket 61 so as to exclude any light except the operating light admitted through the glass pane 63. A cylindrical course card 81 also depends from said gear ring 73. The outer instrument casing 56 has a glass covered window 82 through the upper half of which is visible the registering cardinal of the course card 81. For comparing the compass card position with that of the preset course card 81 the compass card is projected to the lower half of the window 82 as shown in Fig. 1.

The compass card is provided around the margin 83 of the shutter 17. This is projected into a vertical indication onto the lower half of the window 82 by means of a projector 84. The projector 84 in this illustration includes a tube 86 held in a bracket 87 which extends upwardly from the compass superstructure 58. The tube 86 is cut at an angle at its end overlapping the shutter margin 83. A Lucite bar 88 is held in the tube 86. The end of the Lucite bar 88 is cut at about a 45° angle so as to extend at its outer and upward inclined surface 89 opposite and above the shutter margin 83. This inclined surface 89 transmits the reflection of the compass cardinals on the shutter margin 83 onto a flat top surface 91 which latter is mirrored so as to reflect back the marginal cardinal indication which is then reflected again by said inclined surface 89 axially outwardly toward the other end of the bar 88. The outer end of the bar is formed in the shape of a convex lens 92 so as to project a properly enlarged compass cardinal onto the lower half of the window 82 below the set course cardinal.

The entire instrument is covered by the instrument casing 56 which is secured in place by screws 93. Upon the removal of the knob 78 and the screws 93 the whole casing 56 can be removed leaving the instrument parts on the base 57 exposed. The casing 56 has an opening 94 opposite the mirror 66 so as to reflect light onto the mirror 66 in such a manner that the light reflects from the mirror 66 through the shutter 17 unto the photo-electric cells 15 and 16 thereabove.

This arrangement allows the locating of the source of light 18 outside the compartment of the compass 54 and obviates inaccuracies otherwise caused by heating. The lamp 18, in this illustration an electric light bulb is suitably held in a socket 96 which latter forms part of a cylindrical lamp housing 97 provided with suitable ventilation apertures 98. The lamp housing 97 is suitably mounted on the instrument casing 56 so that an opening 99 of said housing opposite to the lamp 18 is in registry with the casing opening 94 and is aligned with the shutter mirror 66 so that the light rays from the lamp 18 reflect upon the inclined mirror 66. A convex reflector 101 on the wall of the lamp housing 97 is located behind the lamp 18 so as to further condense the light rays from the lamp 18 unto said inclined mirror 66. In the joining passage 102 between the lamp 18 and the inclined mirror 66 is a set of lenses 103 held in a bushing 104 which latter is adjustably held in place by a set screw 106. The lenses 103 are made of heat resisting material so that in addition to condensing the light rays upon said inclined mirror 66 the lenses 103 also effectively prevent the transmission of the usual heat of the lamp 18 into the instrument compartment. This assures accuracy under all circumstances. By adjusting the lenses 103 to a certain focus, and also by correspondingly adjusting the sensitive relays 28 and 29 to close at a correspondingly selected intensity of photo-electric action of the photo cells 15 and 16 respectively, the extent or zone of the initial deviation at which the controls are actuated in intermittent actuation is predetermined.

In order to further facilitate the operation and accuracy of the compass, a novel compass compensator arrangement is provided which eliminates the necessity that heretofore existed for the gearing and complicated compensator adjusting structures. This usual magnet compensator 107 is not secured to the compass 54 but to the bottom 108 of the instrument casing 56. This compensator 107 is accessible for adjustment from the outside through a hole 109, which latter is normally covered by a removable plug 110.

In operation the shutter and shaft are held on the top of the compass case and light is reflected so as to permit the use of a very light compass card and shutter which stops practically all motivation of compass or card or shutter by moment of inertia. The light source is outside of the compass space and light is transmitted by the system of lenses in a manner which allows adjustment for variations of initial light intensity and also keeps the heat out of the instrument compartment. The light is then reflected from the inclined mirror 66 through the shutter 17. From there the light again passes through a preferably heat resistant transparent window 63 and unto the cells 15 and 16 to such extent as admitted by the shutter 17. The position of the photo-electric cells relatively to the shutter 17 and to the compass 54 is preadjusted by turning the knob 78 until the desired cardinal of the course card 81 is in registry with the side window 82. The relative position of the photoelectric cells thus adjusted to the compass 54 and to the compass controlled shutter 17 determines the compass course to which the mobile object will be held. As long as the mobile object moves in the given direction the division of the opaque part of the shutter 17 is directly at right angles to the division line between and across both cells 15 and 16 and both cells are equally subjected to a certain minimum amount of light to keep the primary, sensitive circuit breakers 28 and 29 partially energized but open. If the moving object turns off the preset course the shutter 17 is held by the compass 54 but the cells 15 and 16 turn with the object relatively to the shutter 17 so that one of the cells 15 or 16 will be opposite to more of the lighted or transparent area of the shutter 17 and therefore the light falling thereon is increased so as to increase the photo-electric action on the respective circuit and to operate the controls as heretofore described. In practice the relative energization of the primary circuit breakers 28 and 29 are so adjusted and the opaque parts of the shutter 17 are so proportioned, that up to about one degree deviation off the set course the corrective action operates in rapid oscillation by reason of the very small light difference on the respective cells and the correspondingly small increase in the photo-electric action. During this period a very slight actuation of the control varies the light sufficiently to stop the action and therefore the oscillation will be rapid. As the deviation is increased up to about 3½ degrees the light action is correspondingly increased so that the periods of intermittent action gradually increase until at said latter degree of deviation the light is increased enough so that the photo-electric action entirely overcomes the reducing effect of the electromagnets on the current and the corrective pull becomes continuous. For instance if an aircraft drifts off course one or two degrees a very small rudder action is intermittently applied to put the aircraft back on its course in an easy and soft manner. When the aircraft is blown off course three or more degrees the rudder action is continuous until the aircraft is steered back within two degrees or less. Then the action becomes intermittent and the closer the aircraft returns to its neutral or selected course, the lighter and quicker the intermittent action becomes until it entirely stops when the aircraft is on its preset course. This deviation from the preset course can be also visually determined and compared at a glance on the side window 82, because the compass card position is reflected through the projector 84 on the side window 82 just below the cardinal of the preset course card 81.

Having thus described my invention what I now claim and desire to secure by Letters Patent is:

1. An attitude maintaining apparatus for a movable object comprising attitude control means on the object, a mechanism to operate said control means respectively in opposite directions, said mechanism being electrically actuated, photo-electric control means for said mechanism including a light, and attitude responsive means to control the photo-electric action of said photo-electric control means in accordance with the direction and extent of deviation of said object from a predetermined attitude, means to supply electric current to the electric circuit of said mechanism at substantially constant capacity, the electrical circuit of said mechanism and said photo-electric control means including a normally open circuit breaker between the photo-electric control and the electrically actuated control operating mechanism, means responsive to a predetermined electric current in the photo-electric circuit to close said circuit breaker, a source of electricity of substantially constant capacity supplying electricity to said electrically actuated control operating mechanism and to said light, the capacity of said source of electricity being such that the operation of said electrically actuated control operating mechanism during an initial deviation decreases the action of said light on the photo-electric control means to an extent substantially equal to the increase of photo-electric action caused by each such initial deviation but less than the photo-electric action caused by deviation of said object in excess of said initial deviation.

2. In an attitude maintaining apparatus for a movable object, the combination with the attitude control elements of the object, electrically actuated means to operate said control elements, photo-electric means to actuate said operating means including a source of light, and an electric current supply of substantially constant capacity for said actuating means and said light; of means responsive to the variations of the attitude of the movable object to control the photo-electric action of said photo-electric means in accordance with the relative attitude of the object so as to cause a correction of any deviation from said attitude, said photo-electric action in a predetermined attitude of said object being insufficient to actuate said operating means, the capacity of the electric circuit between said source of electricity, said operating means and said light being such that each operation of said operating means decreases the photo-electric action caused by the initial deviation of said object from its predetermined attitude but to a less extent than the increase of photo-electric action in excess of said initial deviation.

3. In an attitude maintaining apparatus for a movable object, the combination with the attitude regulating elements of the apparatus and electrically actuated means including a source of electricity supplying electric current at a substantially constant capacity to operate said attitude regulating elements so as to correct deviations from a predetermined attitude; of photo-electric actuating means for the operating means, comprising means to create photo-electric action including photo-sensitive elements and a light to act on said photo-sensitive elements, means to control the exposure of the photo-sensitive elements of said photo-electric means to said light in accordance with changes of attitude of said object, and an electric circuit acted upon by said electrically actuated means to reduce said exposure of said photo-sensitive elements to said light so as to diminish the action of said photo-electric means alternately with each actuation of the regulating means during changes of attitude within a predetermined degree of variation.

4. The combination with the steering mechanism of a mobile object, of a direction control apparatus comprising, electrically actuated means to operate said steering mechanism, means actuated by photo-electric action to regulate the electric circuit of said electrically actuated means to operate the steering mechanism into one direction or another, direction responsive means to control the photo-electric action for the regulation of said electric circuit in direct ratio to the deviation of said mobile object from a predetermined course, a source of electricity supplying electric current to the electric circuit of said electrically actuated operating means and to said light at a substantially constant capacity, a normally open circuit breaker for said operating means, means to close said circuit breaker by a predetermined photo-electric action, the supply of electricity being of such capacity that each actuation of said operating means reduces the light and the photo-electric action sufficiently to allow the opening of the circuit breaker during an initial range of deviation of said object, said reduction of photo-electric action caused by each operation of said steering operating means during the deviation of said object beyond said initial range being less than the increase of photo-electric action caused by said increased deviation.

5. The combination with the steering mechanism of a mobile object, of a direction control apparatus comprising, electrically actuated means to operate said steering mechanism, means actuated by photo-electric action to regulate the electric circuit of said electrically actuated means to operate the steering mechanism into one direction or another, direction responsive means to control the photo-electric action for the regulation of said electric circuit in accordance with the deviation of said mobile object from a predetermined course, said photo-electric action actuated means being adjustable relatively to said direction responsive means so as to determine the predetermined course of the mobile object, a light for said photo-electric action, means operated by each operation of said electrically actuated means to decrease the electric current of said light, said decrease being substantially equal to the increase of light action caused by an initial deviation of said object from said course so as alternately to interrupt said steering operation during such initial deviation, but said decrease being insufficient to counteract the photo-electric action beyond said initial deviation.

6. A direction control apparatus for aircraft having exterior steering surfaces, comprising means for adjusting the action of said surfaces for steering the aircraft, electro-magnetic means for operating said adjusting means in one direction or the other, said electro-magnetic means including electro-magnets for actuating said moving means respectively in opposite directions, a normally open circuit breaker for each electro-magnet, a normally open but partially energized sensitive circuit breaker for the circuit of each of the first circuit breakers, a pair of adjacent photo-electric cells respectively connected to said sensitive circuit breakers for closing the same when the photo-electric action is increased, and an electric light source to project light to said photo-electric cells for creating photo-electric action, a member in the path of the light normally admitting an amount of light to create sufficient photo-electric action to keep said sensitive circuit-breakers energized but insufficient to close said sensitive circuit breakers, said member being adapted to increase the admitted light to either photo-electric cell upon change of relative position of the member, compass actuated means to cause the change of relative position between the member and the cell in accordance with change of direction of the aircraft so as to increase the admitted light to one or the other photo-electric cell in accordance with the direction of deviation, a source of electricity to supply electric current at a substantially constant capacity to said electromagnetic operating means and to said electric light source so that each operation of said electro-magnetic means decreases the intensity of the light in about the same degree as the increase of light admitted by said member to the respective cells during an initial change of direction of the aircraft up to a predetermined degree of turn, so as to open said circuit breakers momentarily and intermittently, and means to adjust the initial position of said photo-electric cells relatively to said member to a predetermined compass course.

7. Means to intermittently actuate the control members of a mobile object at the initial deviation of said object from a predetermined attitude, comprising an electric circuit for said control members, a circuit breaker in said circuit, a photo-electric cell associated with said circuit-breaker so as to close said circuit breaker upon a predetermined energization of said photo-electric cell, means to control the light admitted to said cell so as to gradually increase the amount of light admitted to said cell in accordance with the increase of deviation of said object from said predetermined attitude, and a source of electricity to supply electric current to the electric circuit of said control members and to said light at such constant capacity that each operation of said control members momentarily decreases the intensity of light from the light source substantially to the same degree as the increase of light admitted to the cell during the initial deviation of said object so as to alternately open and close said circuit breaker during such initial deviation.

8. In a direction control for mobile objects, the combination with movable control elements having electric actuating means to move said controls so as to steer respectively in opposite directions; of a pair of photo-electric cells, a source of light for the activation of said cells, a shutter interposed between the light and said cells, direction responsive means for varying the transmission of light through said shutter so as to increase the light on one cell or on the other in accordance with the deviation of the mobile object from a predetermined direction, a sensitive normally open circuit breaker interposed in each cell circuit for the respective control members so as to be closed by a predetermined amount of activation of the respective cells, means of connection between said source of light and said actuating means for the controlling elements to decrease the intensity of light upon said cells to below said predetermined amount of activation upon each operation of said actuating means within an initial zone of said deviation of said object, the said decrease being smaller than the increased light caused by deviation in excess of said initial zone of deviation.

9. In an apparatus for control of relative movement of objects by photo-electric action, a pair of photo-electric surfaces held side by side, a source of light, a shutter between the source of light and said surfaces, said shutter having a transparent area simultaneously in registry with both surfaces, the remaining area of said shutter being rendered opaque at gradually increasing degree from the center of the shutter toward its periphery, means to angularly move said cells and said shutter relatively to each other in accordance with said relative movement to be controlled, and means to convert the changes of photo-electric action created by said relative movement of the shutter and cells into controlling force for said relative movement of objects.

10. A device for controlling the steering mechanism of a vehicle, comprising electrical operating means for the steering mechanism, circuit controls for said electrical operating means, photo-electric elements for energizing said circuit controls, an electrically operated light, a direction-responsive member to control the incidence of light to the respective photo-electric elements according to the direction and extent of deviation of the vehicle from a predetermined course, an electric circuit of predetermined current capacity supplying electric current both to said electrically operated light and to said electrical operating means, said light and said operating means being circuit elements of such preselected value and being so connected into said circuit that the increase of electric supply to said operating means during each operation of said operating means decreases the intensity of the light to said photo-electric elements in the same proportion as the direction-responsive member increases said light to either photo-electric element during an initial deviation of said vehicle from said predetermined course, and said decrease of light being smaller than the increase of light through said direction responsive member during deviation of said vehicle beyond said initial deviation.

11. A device for controlling the steering mechanism of a vehicle, comprising electrical operating means for the steering mechanism, circuit controls for said electrical operating means, photo-electric elements for energizing said circuit controls, said circuit controls including normally open sensitive circuit breakers being partially charged by the action of said photo-electric elements, an electric light, a shutter between said light and said photo-electric elements adapted to initially expose balanced portions of said photo-electric elements to said light, adjustable direction responsive means for relatively moving said shutter so as to increase the exposure of either of said photo-electric elements according to the deviation of said vehicle from a predetermined course, a limited capacity current source, means to connect said light to said electric operating means, said light and said electric operating means being of such pre-selected values that each operation of said operating means decreases the light in the same proportion as said increase of exposure during an initial zone of said deviation of the vehicle, said decrease being less than the increase of exposure during deviation beyond said initial zone.

WILLIAM L. COOLEY.